(12) United States Patent
Furuya et al.

(10) Patent No.: US 8,483,746 B2
(45) Date of Patent: Jul. 9, 2013

(54) SYSTEM, BASE STATION AND METHOD OF CONTROLLING SYSTEM

(75) Inventors: Takehiro Furuya, Sapporo (JP); Tetsuo Takamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/966,755

(22) Filed: Dec. 13, 2010

(65) Prior Publication Data

US 2011/0312369 A1 Dec. 22, 2011

(30) Foreign Application Priority Data

Dec. 18, 2009 (JP) ................................ 2009-287670

(51) Int. Cl.
*H04W 36/08* (2009.01)
*H04W 36/00* (2009.01)

(52) U.S. Cl.
USPC ......... 455/525; 455/437; 455/67.11; 455/439

(58) Field of Classification Search
USPC .................. 455/437, 440, 456.1, 562.1, 436, 455/438, 439, 442, 524, 525, 67.11, 509; 370/331, 338
See application file for complete search history.

(56) References Cited

U.S. PATENT DOCUMENTS

| 5,893,033 A * | 4/1999 | Keskitalo et al. ............. 455/437 |
| 2007/0025293 A1 * | 2/2007 | Choi ............................ 370/331 |
| 2009/0279507 A1 | 11/2009 | Kanazawa et al. | |

FOREIGN PATENT DOCUMENTS

| JP | 2000-184424 A | 6/2000 |
| JP | 2007-515826 | 6/2007 |
| JP | 2009-538583 | 11/2009 |
| WO | WO 2005/027556 A1 | 3/2005 |
| WO | WO 2007/069319 A1 | 6/2007 |
| WO | WO 2007/105625 A1 | 9/2007 |
| WO | WO 2007/137703 A1 | 12/2007 |

OTHER PUBLICATIONS

Japanese Office Action mailed May 7, 2013 for corresponding Japanese Application No. 2009-287670, with partial English-language translation.

* cited by examiner

*Primary Examiner* — John J Lee
(74) *Attorney, Agent, or Firm* — Fujitsu Patent Center

(57) ABSTRACT

A system has a first base station for performing communication with a plurality of radio terminals, and a plurality of second base stations, the first base station estimating a moving direction of each of the radio terminals, determining one of the second base stations to which the each of the radio terminals is handed over on the basis of the estimated moving direction, obtaining priority information indicating a priority of the each of the radio terminals from the each of the radio terminals, and sending out identification information of the each of the radio terminals and the priority information of the each of the radio terminals to the determined second base station, the determined second base station performing handover of the radio terminals corresponding to the identification information received from the first base station on the basis of the received priority information and the received identification information.

15 Claims, 12 Drawing Sheets

FIG. 3
30

START

31
FIRST BASE STATION DEVICE ACQUIRES PRIORITY INFORMATION WHICH INDICATES RESPECTIVE PIECES OF IDENTIFICATION INFORMATION USED TO SPECIFY RADIO TERMINALS IN A GROUP OF RADIO TERMINALS WHICH IS ESTIMATED TO MOVE IN A PREDETERMINED DIRECTION AND ORDERS OF PRIORITY OF THESE RADIO TERMINALS, ESTIMATES SECOND BASE STATION DEVICE AS THE HANDOVER (OR RE-CONNECTION) DESTINATION OF RADIO TERMINALS ON THE BASIS OF THE PREDETERMINED DIRECTION, AND SENDS IN ADVANCE SECOND BASE STATION DEVICE ACQUIRED PRIORITY INFORMATION

33
SECOND BASE STATION DEVICE EXECUTES HANDOVER (RE-CONNECTION) OF A PLURALITY OF RADIO TERMINALS THAT REQUEST SECOND BASE STATION FOR HANDOVER ON THE BASIS OF PRIORITY INFORMATION

END

SYSTEM, BASE STATION AND METHOD OF CONTROLLING SYSTEM

CROSS-REFERENCE TO RELATED APPLICATION

This application is based upon and claims the benefit of priority of the prior Japanese Patent Application No. 2009-287670, filed on Dec. 18, 2009, the entire contents of which are incorporated herein by reference.

FIELD

The present art relates to a system, a base station and a method of controlling the system.

BACKGROUND

For example, in a W-CDMA system, when a radio terminal comes near the border of an area that a base station as the move source (a base station which serves as the move source from the radio terminal starts moving), it detects a preamble signal sent from a base station as the move destination (a base station which serves as the move destination toward which the radio terminal moves). When the radio terminal comes near the boundary between the area that the base station as the move source covers and the area that the base station as the move destination covers, the preamble signal receiving sensitivity of the radio terminal is increased to a value higher than a threshold value and the radio terminal receives data sent from the both base stations in a synthesized form. Then, when the radio terminal enters the area that the base station as the move destination covers, the intensity of the preamble signal which is sent from the base station as the move source is decreased and the data signal sent from the base station as the move source is cut. As a result, it may become possible for the radio terminal to maintain communication even though the radio terminal moves striding over the boundary between two areas.

Incidentally, in mobile communication, a base station including a terminal-class-based handoff (handover) processing table in which whether handoff (handover) is possible is set per terminal class and a handoff control unit is proposed as disclosed, for example, in Japanese Laid-open Patent Publication No. 2000-184424. In the above mentioned base station, when it is detected that handoff is desirable from a quality information signal sent from a mobile terminal, the handoff control unit judges whether handoff is allowable with reference to the terminal-class-based handoff processing table using the terminal class of the mobile terminal. Then, only when handoff is judged to be allowable, handoff is executed.

However, in an existing system of the above mentioned type in which handoff is executed with reference to the terminal-class-based handoff processing table using the terminal class of the mobile terminal, for example, in the case that there exist many mobile terminals belonging to the same terminal class, many mobile terminals start gaining access to the base station as the move destination almost simultaneously when many users of the mobile terminals are on a train which is running at a high speed and when the train has passed through a tunnel and hence overcrowding may occur owing to concentrated accesses to the base station as the move destination.

SUMMARY

According to an aspect of an embodiment, a system has a first base station for performing communication with a plurality of radio terminals, and a plurality of second base stations for performing communication with the plurality of radio terminals, the first base station estimating a moving direction of each of the radio terminals, determining one of the second base stations to which the each of the radio terminals is handed over on the basis of the estimated moving direction, obtaining priority information indicating a priority of the each of the radio terminals from the each of the radio terminals, and sending out identification information of the each of the radio terminals and the priority information of the each of the radio terminals to the determined second base station, the determined second base station performing handover of the radio terminals corresponding to the identification information received from the first base station on the basis of the received priority information and the received identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Next, preferred embodiments will be described in detail with reference to the accompanying drawings.

First Embodiment

Figure 1:
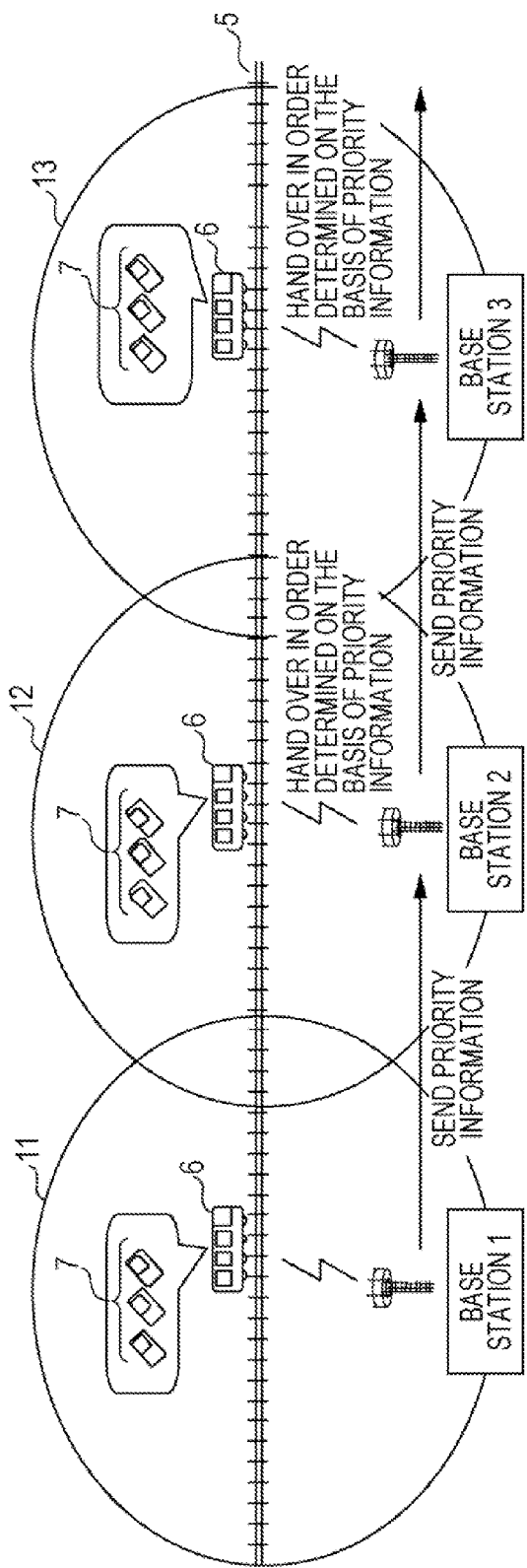
FIG. 1A is a diagram illustrating an example of a configuration of a radio communication system according to a first embodiment.
FIG. 1B is a diagram illustrating an example of a configuration of a radio communication system according to an altered embodiment of the first embodiment.
FIG. 1C is a diagram illustrating an example of a configuration of priority information.

FIG. 1A is a diagram illustrating an example of a configuration of a radio communication system 10 according to a first embodiment. The radio communication system 10 includes base stations 1, 2, 3, . . . and the base stations 1, 2, 3, . . . respectively cover areas (cells) 11, 12, 13, . . . .

The base stations 1, 2, 3, . . . are respectively disposed along a railroad line 5 and a train 6 is running on the railroad line 5. The example illustrated in FIG. 1A indicates a state in which the train 6 sequentially passes through the respective areas 11, 12 and 13 as the time goes by, by illustrating the train 6 in each of the area 11, 12 and 13.

A plurality of users is on the train 6 and the plurality of users respectively carries their own radio terminals (generally designated by 7).

When the train 6 arrives at the boarder of the area 11 that the base station 1 covers and the intensity of a radio wave received from the base station 1 is reduced, each of the plurality of radio terminals 7 starts gaining access to the adjacent base station 2. Likewise, when the train 6 arrives at the boarder of the area 12 that the base station 2 covers and the intensity of a radio wave received from the base station 2 is reduced, each of the plurality of radio terminals 7 starts gaining access to the adjacent base station 3.

Next, handover of radio terminals from the base station 1 to the base station 2 will be described by way of example.

In the case that the train 6 is running on the railroad line 5 at a high speed, when the train 6 arrives at the boarder of the area 11 that the base station 1 covers, the plurality of radio terminals 7 start gaining access to the base station 2 almost simultaneously.

In the case that the number of the radio terminals 7 is small and the speed of the train 6 is low, the base station 2 is permitted to execute handover of the plurality of radio terminals 7 from the base station 1. However, in the case that the number of the radio terminals 7 is large and the speed of the train 7 is high, overcrowding may occur and hence it may become difficult for the base station 2 to normally execute handover of the plurality of radio terminals 7 from the base station 1.

Thus, the base station 1 acquires priority information indicating the order of priority of each of the plurality of radio terminals 7 (a group of radio terminals) which are estimated to move in a direction in which the train 6 progresses. In addition, the base station 1 estimates the base station 2 which is the destination to which the plurality of radio terminals 7 will be handed over on the basis of the direction in which the train 6 progresses. Then, the base station 1 sends the base station 2 identification information used to specify the plurality of radio terminals 7 and priority order information indicating the order of priority of each of the plurality of radio terminals 7 in advance before the plurality of radio terminals 7 start gaining access to each of the respective base stations 2, 3, . . . . Handover of the radio terminals 7 from the base station 2 to the base station 3 is executed in the same manner as the above.

Therefore, for example, when each radio terminal 7 measures the intensity of a signal sent from the base station 1 and notifies the base station 1 of the measured value and the base station 1 detects that the measured value has become lower than a predetermined threshold value on the basis of the notified value, the base station 1 is permitted to send priority order information to the base station 2. In addition, when the radio terminals 7 haven been handed over to the base station 1 or when a predetermined time has elapsed after handover, the base station 1 is permitted to send the base station 2 the priority order information. In addition, before the train 6 arrives at the border of the area 11 that the base station covers on the basis of running information (not illustrated) of the train 6 that the base station 1 acquires together with the priority order information, the base station 1 is permitted to send the base station 2 the priority order information.

Movement of the plurality of radio terminals 7 in the progressing direction of the train 6 may be estimated on the basis of moving history and moving schedule of the plurality of radio terminals 7 as will be described later with reference to FIGS. 6 to 8 and 10.

The base station 2 determines order in which the plurality of radio terminals 7 are handed over on the basis of the identification information and the priority order information of the plurality of radio terminals 7 that the base station 2 has received in advance from the base station 1 and executes handover of the plurality of radio terminals 7. Owing to the above mentioned operations, it may become possible for the base station 2 to avoid overcrowding which would occur at its own station. Handover of the radio terminals 7 from the base station 2 to the base station 3 is executed in the same manner as the above.

As an alternative, the base station 1 may acquire the identification information and the priority order information, for example, from an external information source (not illustrated) and these pieces of information may be sent from the base station 1 to the base station 2, then from the base station 2 to the base station 3 (and so on) as the train 6 progresses. In the above mentioned case, transmission of these pieces of information is realized over a superior network (not illustrated) with which the base stations 1, 2, 3, . . . are connected.

According to another embodiment, each of the base stations 2, 3 and so on may acquire the identification information and the priority order information from an external information source (not illustrated).

FIG. 1B is a diagram illustrating an example of a configuration of a radio communication system 10' according to an altered embodiment of the first embodiment. The above mentioned altered embodiment differs from the first embodiment illustrated in FIG. 1A in that a tunnel T is installed between the area 12 that the base station 2 covers and the area 13 that the base station 3 covers.

When the train 6 enters the tunnel T, communication between each of the plurality of radio terminals 7 of the plurality of users who are on the train 6 and the base station 2 is interrupted.

When the train 6 goes out of the tunnel T, the plurality of radio terminals 7 of the plurality of users who are on the train 6 request the base station 3 for re-connection so as to communicate with the base station 3.

Thus, the base station 2 acquires priority order information indicating the order of priority of each of the plurality of terminals 7 (a group of radio terminals) which are estimated to move in the progressing direction of the train 6. In addition, the base station 2 estimates the base station 3 which is the destination with which the plurality of radio terminals 7 will be re-connected on the basis of the progressing direction of the train 6. Then, the base station 2 sends the base station 3 the identification information used to specify the plurality of radio terminals 7 and the priority order information indicating the order of priority of each of the plurality of radio terminals 7 in advance before the plurality of radio terminals 7 start gaining access to the base station 3.

On the other hand, the base station 3 determines order in which re-connection of the plurality of radio terminals 7 is executed on the basis of the identification information and the priority order information of the plurality of radio terminals 7 that the base station 3 has received in advance from the base station 2 and then executes re-connection of the plurality of radio terminals 7. Owing to the above mentioned operations, it may become possible for the base station 3 to avoid overcrowding which would occur at its own station.

FIG. 1C is a diagram illustrating an example of a configuration of priority information 15. In the priority information 15, respective pieces of terminal identification information 1, 2, . . . and N (N=1 or more integers) of the respective radio terminals 7 and orders of priority which are allocated to the respective radio terminals 7 are stored in one-to-one correspondence. Numerals in the terminal identification information are inherent identification numbers that, for example, each mobile communication service dealer allocates to respective radio terminals.

FIG. 1C illustrates an example in which different priority orders are allocated to different terminals. As an alternative, the same priority order may be allocated to two or more different radio terminals.

Figure 2:
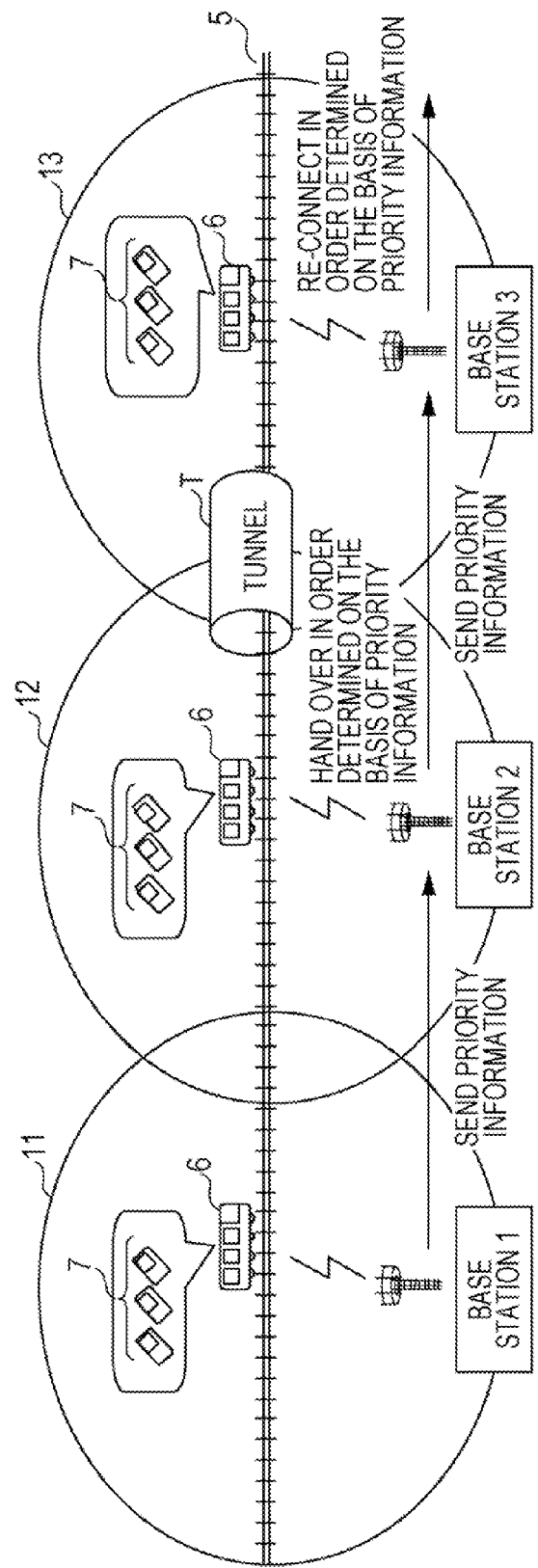
FIG. 2 is a block diagram illustrating an example of a configuration of a base station device according to the first embodiment.

FIG. 2 is a block diagram illustrating an example of a configuration of the base station 2 according to the first embodiment. Next, the configuration of the base station device 2 illustrated in FIGS. 1A and 1B will be described by way of example. Incidentally, the base station devices 1, 3, . . . are configured in the same manner as the base station device 2.

The base station device 2 includes a radio communication unit 21 that performs radio communication with a radio terminal (not illustrated). The base station device 2 also includes a wire communication unit 22 that performs wire communication with a superior network. The base station device 2 further includes a control unit 23 that controls handover and re-connection of radio terminals.

First, in the case that a group of radio terminals is to be handed over to or re-connected with another base station (for example, the base station 3 illustrated in FIGS. 1A and 1B), the control unit 23 receives priority information 24 indicating respective pieces of identification information of a group of radio terminals (for example, the plurality of radio terminals 7 illustrated in FIGS. 1A and 1B) which are estimated to move in a predetermined direction (for example, the progressing direction of the train 6 illustrated in FIGS. 1A and 1C) and respective orders of priority corresponding to the respective pieces of identification information of the respective radio terminals from a superior network via the wire communication unit 22. The priority information may be sent either from another base station (for example, the base station 1 illustrated in FIGS. 1A and 1B) to the base station device 2 over the superior network or from an external information source other than the base station (for example, a railroad company system 65 illustrated in FIG. 6 or an express-way system 165 illustrated in FIG. 10) over the superior network.

The control unit 23 estimates a base station (for example, the base station 3 illustrated in FIGS. 1A and 1B) which is the destination to which each radio terminal belonging to the group of radio terminals is to be handed over or with which each radio terminal belonging to the group of radio terminals is to be re-connected and sends in advance the estimated base station the priority information 24 which indicates respective pieces of identification information of respective radio terminals belonging to the group of radio terminals and the priority orders corresponding to the respective pieces of identification information of the respective radio terminals.

On the other hand, in the case that the group of radio terminals is to be handed over to or re-connected with itself (the base station 2, the control unit 23 thereof is permitted to determine the order in which the respective radio terminals in the group of radio terminals that request the base station 2 for handover or re-connection on the basis of the priority information 24 which indicates the respective pieces of identification information of the radio terminals in the group of radio terminals and the priority orders corresponding to the respective pieces of identification information of the respective radio terminals and which has been received from another base station device (for example, the base station 3 in FIGS. 1A and 1B) and to execute handover or re-connection of the radio terminals.

The control unit 23 executes handover of the plurality of radio terminals (not illustrated) in determined order and hence may be capable of avoiding overcrowding even when the number of radio terminals to be handed over is large. Incidentally, the control unit 23 is allowed not to execute handover of a radio terminal which is low in order of priority.

Figure 3:
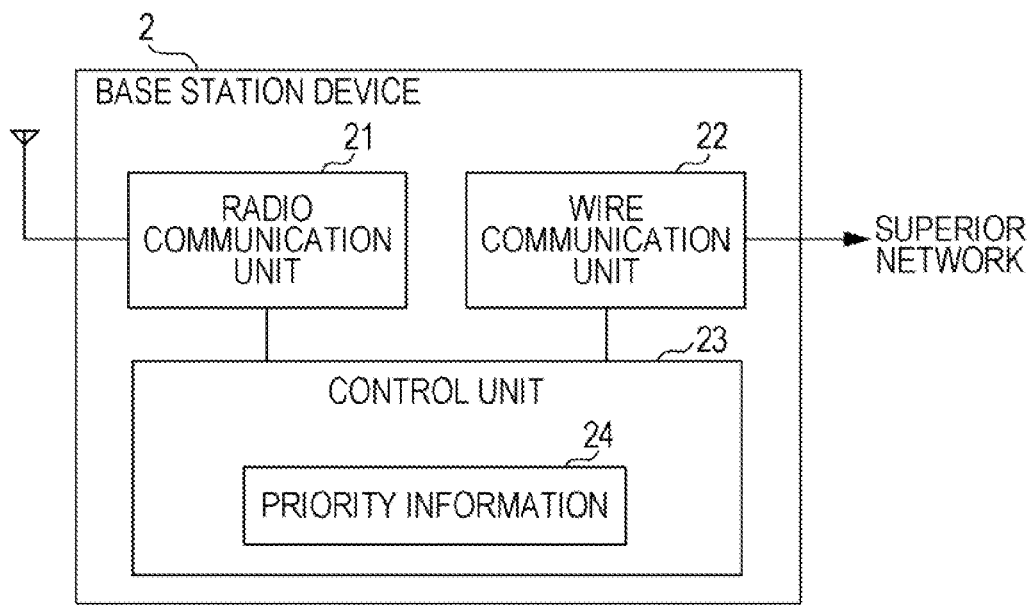
FIG. 3 is a diagram illustrating an example of a sequence for executing a communicating method according to the first embodiment.

FIG. 3 is a diagram illustrating a sequence for executing a communicating method 30 according to the first embodiment. The communicating method 30 is executed using base station devices in mobile communication. Although, as the base station devices, the base station devices illustrated in FIGS. 1A and 1B may be given as an example, the base station devices used are not limited to the above mentioned base station devices.

In the communicating method 30, at step 31, a first base station device (for example, the base station 1 in FIGS. 1A and 1B) acquires priority information which indicates respective pieces of identification information used to specify respective radio terminals in a group of radio terminals which is estimated to move in a predetermined direction and orders of priority of these radio terminals, estimates a second base station device (for example, the base station 2 in FIGS. 1A and 1B) as the destination to which the radio terminals are to be handed over (or with which the radio terminals are to be re-connected) on the basis of the predetermined direction, and sends in advance the second base station device the priority information which indicates respective pieces of identification information used to specify the respective radio terminals and the orders of priority of these radio terminals. In the example illustrated in FIG. 3, "in advance" means to send the priority information, for example, before each radio terminal starts requesting the second base terminal device for handover or re-connection.

Next, at step 33, the second base station device (for example, the base station 2 in FIGS. 1A and 1B) executes handover (or re-connection) of the plurality of radio terminals that request it for handover on the basis of the priority information which indicates respective pieces of identification information used to specify the respective radio terminals and the orders of priority of these radio terminals and which has been received from the first base station device. The second base station device is allowed not to execute handover or re-connection of a radio terminal which is low in priority order.

Second Embodiment

Figure 4:
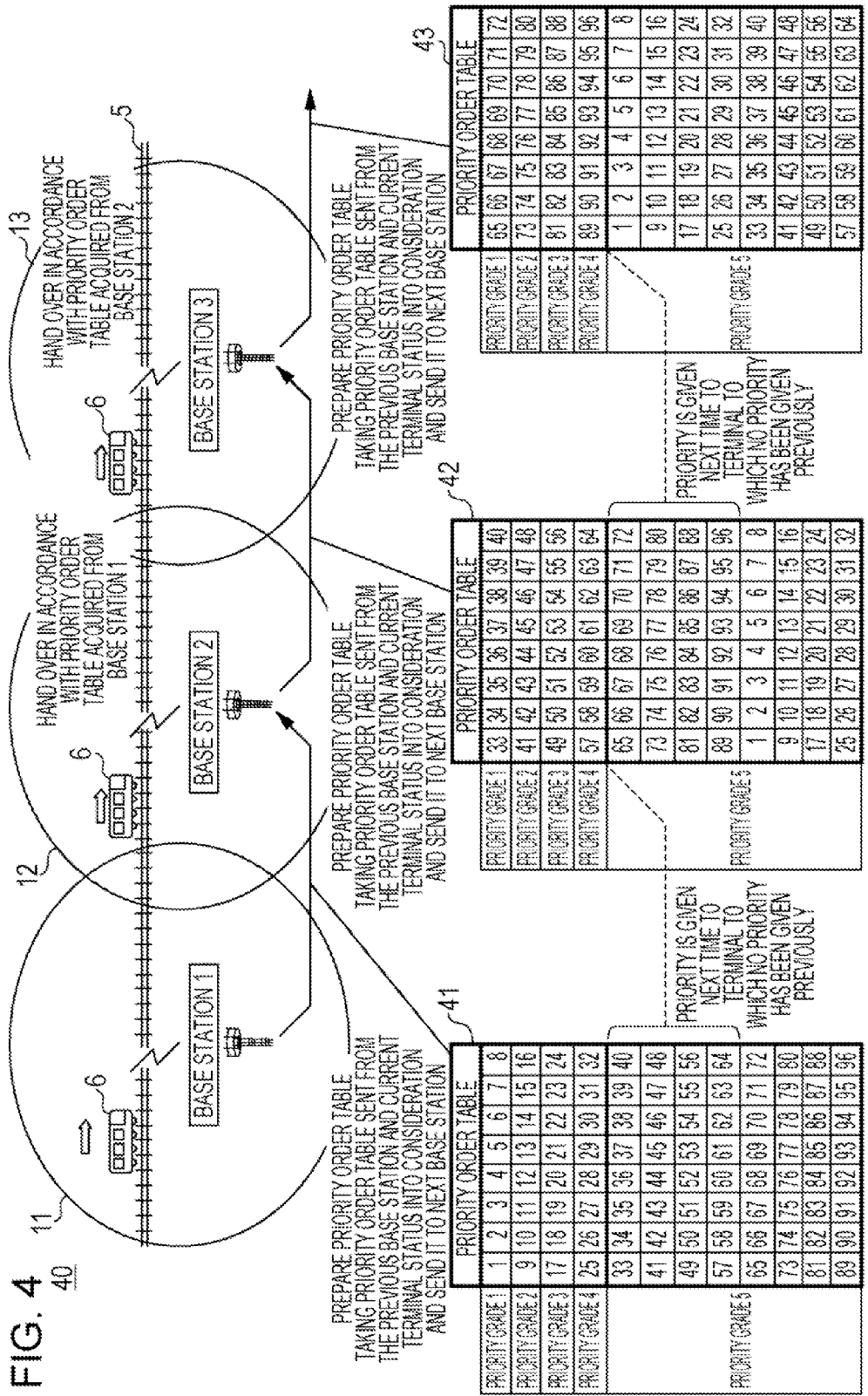
FIG. 4 is a diagram illustrating an example of a configuration of a radio communication system according to a second embodiment.

FIG. 4 is a diagram illustrating an example of a configuration of a radio communication system 40 according to a second embodiment.

The radio communication system 40 includes the base stations 1, 2, 3, . . . and the respective base stations 1, 2, 3, . . . respectively cover the areas (cells) 11, 12, 13, . . . . The base stations 1, 2, 3, . . . are respectively disposed along the railroad line 5 and the train 6 is running on the railroad line 5.

The example illustrated in FIG. 4 indicates a state in which the train 6 sequentially passes through the respective areas 11, 12 and 13 as the time goes by, by illustrating the train 6 in each of the area 11, 12 and 13.

A plurality of users is on the train 6 and the plurality of users respectively carries their own radio terminals (not illustrated in the drawing). The configuration of the radio communication system 40 which has been described so far is the same as that of the radio communication system 10 illustrated in FIG. 1A.

The radio communication system 40 differs from the radio communication system 10 illustrated in FIG. 1A in the form of priority information to be transmitted between base stations.

The base station 1 prepares new priority information (a priority order table) 41 by taking priority information (the priority order table) (not illustrated) which has been sent from the previous base station (not illustrated) or an external information source (not illustrated) and a current status of each radio terminal into consideration and sends the base station 2 the new priority information. Incidentally, the current status of each radio terminal means, for example, whether the user of each radio terminal is now talking over the terminal and/or whether a data packet is being sent or received. For example, priority is given to the radio terminal over which its user is talking also in the new priority information (the priority order table) 41.

In the example illustrated in FIG. 4, in the priority information (the priority order table) 41, degrees of priority (1 to 5) and respective pieces of terminal identification information of radio terminals to which the respective degrees of priority are given are indicated in one-to-one correspondence. The priority order (the priority degree) 1 is allocated to radio terminals corresponding to respective pieces of terminal identification information 1 to 8. The priority order (the priority degree) 2 is allocated to radio terminals corresponding to respective pieces of terminal identification information 9 to 16. The priority order (the priority degree) 3 is allocated to radio terminals corresponding to respective pieces of terminal identification information 17 to 24. The priority order (the priority degree) 4 is allocated to radio terminals corresponding to respective pieces of terminal identification information 25 to 32. The priority order (the priority degree) 5 is allocated to radio terminals corresponding to respective pieces of terminal identification information 33 to 96.

The base station 2 executes handover of the radio terminals in order which has been determined on the basis of the priority information 41 which has been received in advance from the previous base station 1.

The base station 2 prepares new priority information (a priority order table) 42 taking the priority information (the priority order table) 41 which has been sent from the previous base station 1 and a current status of each radio terminal into consideration and sends the base station 3 the new priority information 42.

In preparing the new priority information (the priority order table) 42, the base station 2 is permitted to give higher priority orders (the priority degrees 1 to 4) to the radio terminals corresponding to respective pieces of terminal identification information 33 to 64 which have been set low in the priority order (the priority degree 5) in the previous priority information (the priority order table) 41. On the other hand, the base station 2 is permitted to give a low priority grade (the priority degree 5) to the radio terminals corresponding the respective pieces of terminal identification information 1 to 32 which have been set high in the priority order (the priority degrees 1 to 4) in the previous priority information (the priority order table) 41.

The base station 3 executes handover of the radio terminals in order which has been determined on the basis of the priority information 42 which has been received in advance from the previous base station 2.

The base station 3 prepares new priority information (a priority order table) 43 taking the priority information (the priority order table) 42 which has been sent from the previous base station 2 and a current status of each radio terminal into consideration and sends the next base station (not illustrated) the new priority information 43.

In preparing the new priority information (the priority order table) 43, the base station 3 is permitted to give higher priority orders (the priority degrees 1 to 4) to the radio terminals corresponding to respective pieces of terminal identification information 65 to 96 which have been set low in the priority order (the priority degree 5) in the previous priority information (the priority order table) 42. On the other hand, the base station 3 is permitted to give a low priority grade (the priority degree 5) to the radio terminals corresponding the respective pieces of terminal identification information 33 to 64 which have been set high in the priority order (the priority degrees 1 to 4) in the previous priority information (the priority order table) 42.

Each base station is permitted to prepare new priority information taking priority information which has been received from the previous base station and a current status of each radio terminal into consideration and send the next base station the new priority information in the above mentioned manner. Owing to the above mentioned operations, such a situation may be avoided that the priority is given to a specific radio terminal. Incidentally, priority information may be updated in accordance with the status of each radio terminal.

Figure 5:
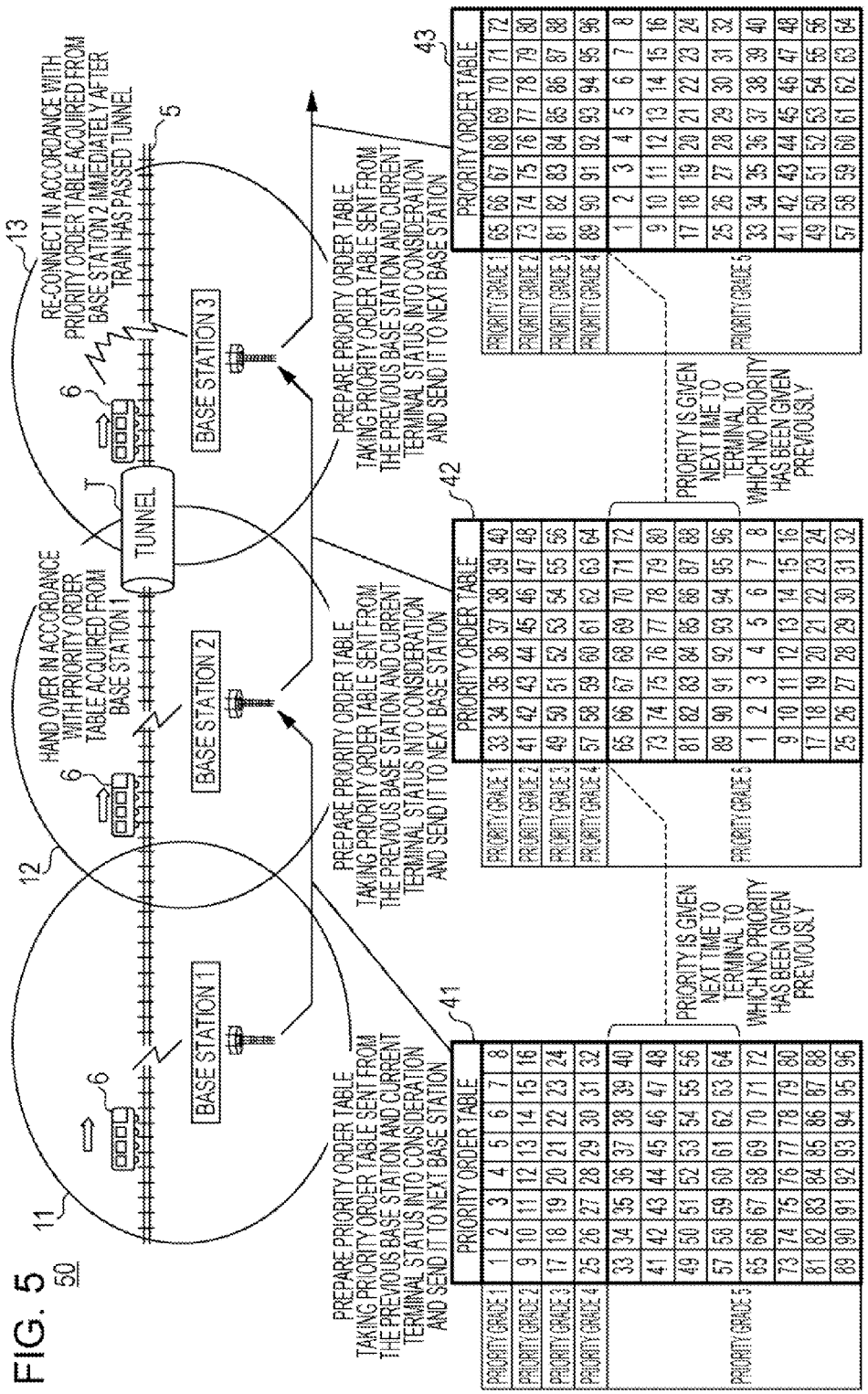
FIG. 5 is a diagram illustrating an example of a configuration of a radio communication system according to an altered embodiment of the second embodiment.

FIG. 5 is a diagram illustrating an example of a configuration of a radio communication system 50 according to an altered embodiment of the second embodiment. Constitutional elements illustrated in FIG. 5 correspond to those illustrated in FIG. 4.

The altered embodiment illustrated in FIG. 5 differs from the second embodiment in that the tunnel T is installed on the railroad line 5 striding over the boundary between the areas 12 and 13. When the train 6 enters the tunnel T, it may become difficult for the radio terminals (not illustrated) of users who are on the train 6 to receive radio waves from the base station 2 and communication with the base station 2 is interrupted. When the train 6 goes out of the tunnel T, the radio terminals (not illustrated) of the users who are on the train 6 receive radio waves from the base station 3 and request the base station 3 for re-connection.

The base station 3 has received in advance the priority information (the priority order table) 42 from the base station 2, so that the base station 3 is permitted to execute re-connection of the radio terminals (not illustrated) of the users who are on the train 6 in order which has been determined on the basis of the received priority information 42. Owing to the above mentioned operations, overcrowding may be avoided even though requests for re-connection are made from many radio terminals simultaneously.

Third Embodiment

Figure 6:
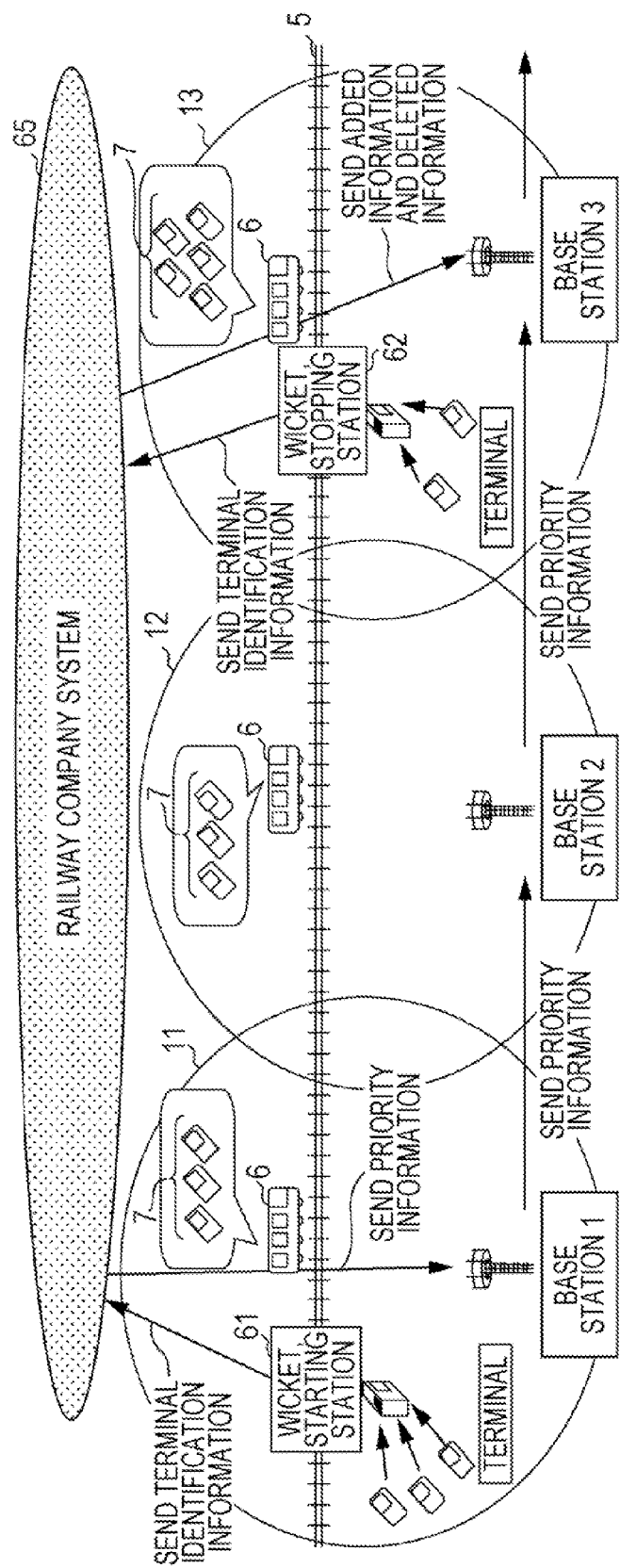
FIG. 6 is a diagram illustrating an example of a configuration of a radio communication system according to a third embodiment.

FIG. 6 is a diagram illustrating an example of a configuration of a radio communication system 60 according to a third embodiment.

The radio communication system 60 includes the base stations 1, 2, 3, . . . and the respective base stations 1, 2, 3, . . . respectively cover the areas (cells) 11, 12, 13, . . . .

The base stations 1, 2, 3, ... are respectively disposed along the railroad line 5 and the train 6 is running on the railroad line 5. The example illustrated in FIG. 6 indicates a state in which the train 6 sequentially passes through the respective areas 11, 12 and 13 as the time goes by, by illustrating the train 6 in each of the area 11, 12 and 13.

A plurality of users is on the train 6 and the plurality of users respectively carries their own radio terminals (generally designated by 7). The configuration of the radio communication system 60 which has been described so far is the same as that of the radio communication system 10 illustrated in FIG. 1A.

The radio communication system 60 differs from the radio communication system 10 illustrated in FIG. 1A in that a starting station and a stopping station are installed on the railroad line 5, a wicket device 61 is installed at the starting station and a wicket device 62 is installed at the stopping station.

At the starting station, a plurality of users who are going to board the train 6 passes through the wicket device 61 using their own radio terminals 7. For example, each user passes through the wicket device and boards the train 6 by making the wicket device 61 read ticket information recorded in an IC card which is incorporated into the ratio terminal 7.

The wicket device 61 sends a railroad company system 65 the terminal identification information on the radio terminal 7 into which the ticket information has been read. The railroad company system 65 is, for example, a system that a communication server who conducts mobile communication business operates in order to generate priority information and send it to base stations. As an alternative, the railroad company system may be a system that a railroad company concerned operates in order to manage booking and wicket passing statuses.

The railroad company system 65 sends the base station 1 priority information including terminal identification information of the radio terminal 7 of each user who has boarded the train 6 and the priority order of the radio terminal 7 concerned. Owing to the above mentioned operations, movement of each radio terminal in a fixed direction may be estimated on the basis of the wicket passing status (moving history information) of each radio terminal.

Incidentally, the priority order of each radio terminal may be either fixed or varied every time each user boards a train. For example, it may be thought to fixedly give a higher priority order to an assembly man of a country, a person in charge of governmental affairs, a person in charge of medical treatment, a frequent user of the train 6 and/or other persons. In addition, it may be also thought to give a higher priority order to passengers of a first-class carriage.

The priority information which has been sent to the base station 1 is sent from the base station to the base station 2 in advance (that is, before the radio terminal 7 of a user who is on the train 6 starts gaining access to the base station 2) as the train 6 progresses. Then, the priority information is sent from the base station 2 to the base station 3 in advance (that is, before the radio terminal 7 of the user who is on the train 6 starts gaining access to the base station 3).

The train 6 stops at the stopping station illustrated in FIG. 6. At the stopping station, some passengers who have been on the train 6 so far get off the train 6 and respectively pass through the wicket device 62 using their radio terminals 7. At the same time, new passengers pass through the wicket device 62 using their radio terminals 7 and board the train 6. Each user passes through the wicket device and gets off the train 6 or boards the train 6, for example, by making the wicket device 62 read the ticket information stored in the IC card which is incorporated into the radio terminal 7.

The wicket device 62 sends the railroad company system 65 terminal identification information of the radio terminals of users who have boarded and gotten off the train 6.

The railroad company system 65 sends the base station 3 terminal identification information of the radio terminals of the users who have newly boarded the train 6 and information on the priority orders of the radio terminals 7 which have been sent from the wicket device 62 as moving history information as information to be added to the priority information. Likewise, the railroad company system 65 sends the base station 3 the terminal identification information of the radio terminals 7 of users who have gotten off the train 6 which has been sent from the wicket device 62 as information to be deleted from the priority information. The base station 3 updates the priority information on the basis of the information to be added and the information to be deleted.

In another embodiment, the railroad company system 65 sends the base station 3 the priority information which includes the terminal identification information of the radio terminals 7 of the users who are on the train 6 after stopped at the stopping station and the priority orders of the radio terminals 7 and which has been sent from the wicket device 62 as alternative priority information to be used in place of the priority information which has been sent from the base station 1. In the above mentioned case, the base station 2 need not send the priority information which has been received from the base station 1 to the base station 3.

Figure 7A:
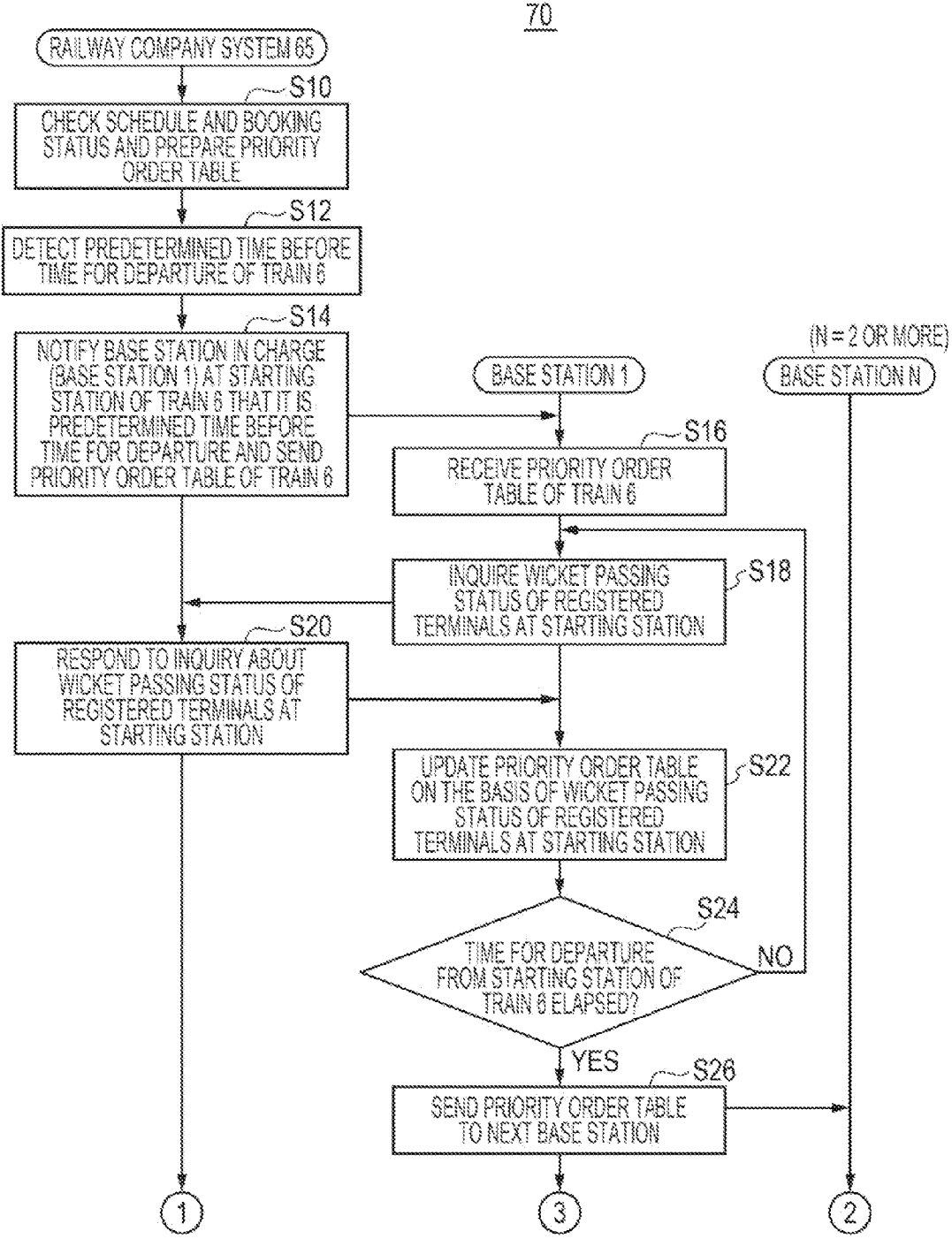
FIG. 7A is a diagram illustrating an example of a sequence for executing a priority information generating and updating method according to an altered embodiment of the third embodiment.
Figure 7B:
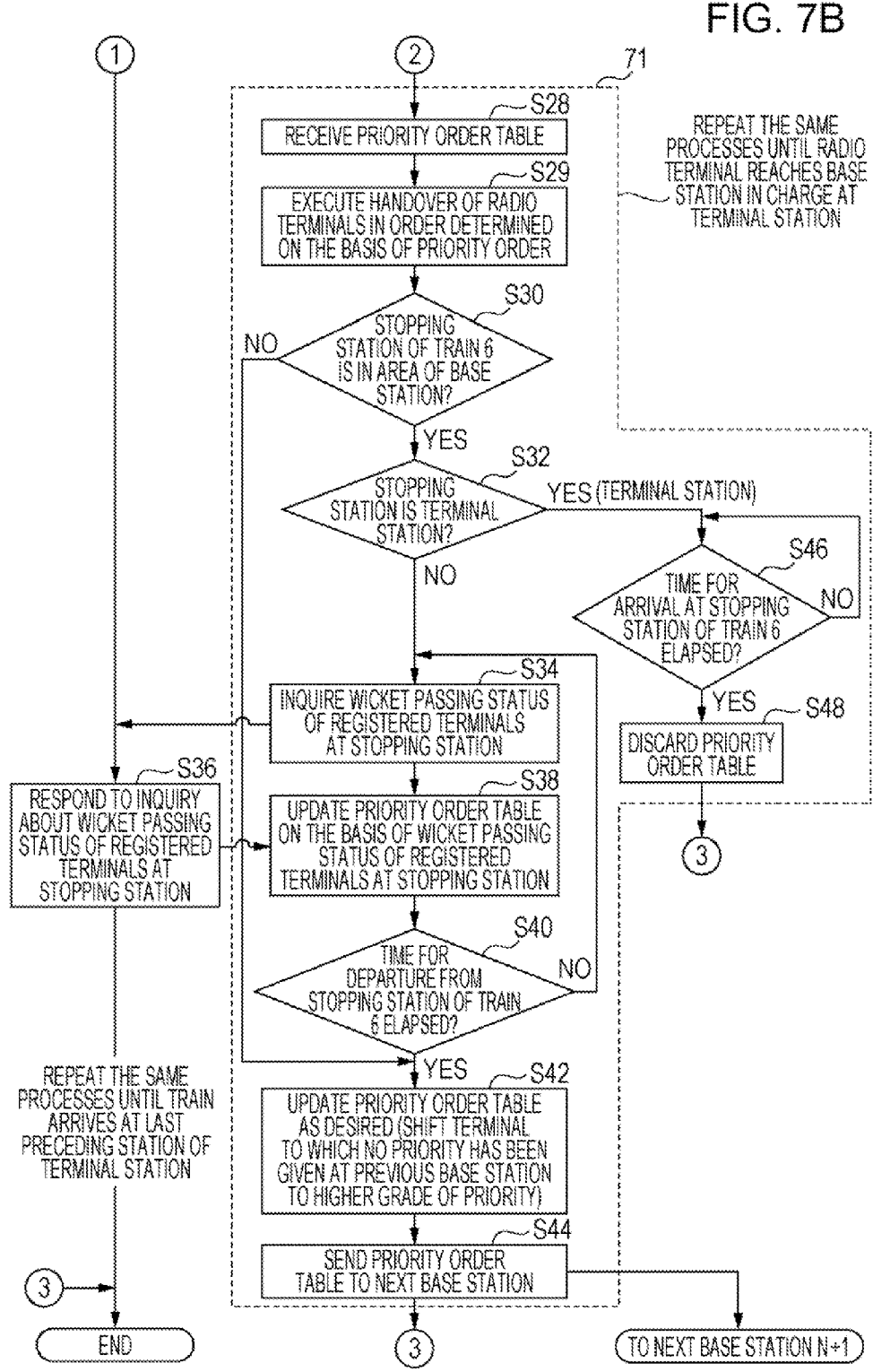
FIG. 7B is a diagram illustrating an example of a sequence for executing a priority information generating and updating method according to an altered embodiment of the third embodiment.

FIGS. 7A and 7B are diagrams illustrating an example of a sequence for executing a priority information generating and updating method 70 according to an altered embodiment of the third embodiment.

In this method 70, the railroad company system 65 prepares a priority order table (priority information) of radio terminals which have been registered in advance on the basis of the booking status of the train 6 and sends the first base station 1 the table. In the case that there exists a stopping station of the train 6 in the area that each of the base stations 1, 2, 3, ... covers, each base station updates the priority order table (the priority information) on the basis of a status in which each radio terminal passes through the wicket device at the stopping station (the starting station for the base station 1).

The railroad company system 65 checks the schedule and the booking status of the train 6 and prepares a priority order table (step S10). In addition, it may be also possible to estimate that a radio terminal will move in a fixed direction on the basis of movement schedule information of the radio terminal which is obtained from the schedule and the booking status of the train concerned. It is assumed that the terminal identification information and the priority order of the radio terminal of a user have been registered into the railroad company system 65 when the user has booked a seat on the train 6. As to grading of the order of priority, a higher priority order may be given to, for example, the radio terminal of a user who has booked a seat earlier than others. In addition, a higher priority order may be given to, for example, the radio terminal of a user who has booked a seat in a first-class carriage. In addition, a higher priority order may be given to, for example, an assembly man of a country, a person in charge of governmental affairs, a person in charge of medical treatment, a frequent user of the train 6 and/or other persons.

The railroad company system 65 detects that it is a predetermined time (for example, three minutes) before the time for departure of the train 6 (step S12).

The railroad company system 65 notifies a base station concerned (in this case, the base station 1) that covers the area where the starting station of the train 6 is present that it is the predetermined time before the time for departure of the train 6 and sends the base station the priority order table of the train 6 (step S14).

The base station 1 receives a notification that it is the predetermined time before the time for departure of the train 6 and the priority order table of the train 6 (step S16).

Next, the base station inquires the railroad company system 65 about a status in which registered terminals (radio terminals which are entered in the priority order table) pass through the wicket at the starting station (step S18).

The railroad company system 65 sends the base station 1 a response to the inquiry about the wicket passing status of the registered terminals at the starting station (step S20).

The base station 1 updates the priority order table which has been received at step S16 on the basis of the wicket passing status of the registered terminals at the starting station (step S22). Incidentally, the information on the wicket passing status of the registered terminals is moving history information. It may become possible to delete the entry of the radio terminal of a user who is not on the train 6 in reality though he has booked a seat from the priority order table on the basis of the above mentioned moving history information, thereby reducing the data size of the priority order table.

The base station 1 judges whether the time for departure from the starting station of the train 6 has elapsed (step S24). When it does not elapse, the process returns to step S18 and the base station 1 repeats the processes of inquiring about the wicket passing status of the registered terminals at the starting station and updating the priority order information on the basis of the response to the inquiry.

When the time for departure from the starting station of the train 6 has elapsed at step S24, the base station 1 sends the next base station 2 the priority order table of the train 6 which has been received from the railroad company system 65 at step S16 and has been updated at step S22 (step S26). In the above mentioned manner, the base station 1 is permitted to send the priority order table to the base station 2 before the radio terminal starts gaining access to the base station 2 by sending the base station 2 the priority order table simultaneously with departure of the train 6 from the starting station.

Incidentally, the operations performed at the base station N (N=2, 3, . . .) are basically the same as the above mentioned operations and hence in FIGS. 7A and 7B, the base stations other than the base station 1 are indicated in the form of "STATION N (N=2 OR MORE)".

The base station N receives the priority order table from the previous base station N−1 (N=2, 3, . . . ) (step S28).

The base station N executes handover of the ratio terminals in order which has been determined on the basis of the priority order table (step S29). The process at step S29 will be described later in more detail with reference to FIG. 8.

The base station N judges whether the stopping station of the train 6 is in the area that it (the base station N) covers (step S30). Judgment may be performed on the basis of train running information indicating possibility of stoppage of the train 6 and the time for arrival and the time for departure of the train 6 at each stopping station. The above mentioned train running information is sent from, for example, the railroad company system 65 to the base station 1 together with the priority order table at step S14 and is sent from the base station 1 to the base station N together with the priority order table at step S26. In the case that the stopping station of the train 6 is present in the area that the base station N covers, the base station N proceeds to step S32.

The base station N judges whether the stopping station which is present in the area that it (the base station N) covers is the terminal station of the train 6 (step S32). In the case that it is not the terminal station, the base station N proceeds to step S34.

The base station N inquires the railroad company system 65 about a status in which the registered terminals pass through the wicket at the stopping station (step S34).

In response to the inquiry from the base station N, the railroad company system 65 notifies the base station N of the wicket passing status of the registered terminals at the stopping station (step S36). In the above mentioned case, the railroad company system 65 sends the base station N terminal identification information of the radio terminals of users who have newly boarded the train 6 at the stopping station and information on the priority orders of the radio terminals which have been sent from the wicket device at the stopping station as information to be added to the priority information. In addition, the railroad company system 65 sends the base station N terminal identification information of the radio terminals of users who have gotten off the train 6 which has been sent from the wicket device at the stopping station as information to be deleted from the priority information.

The base station N updates the priority order table on the basis of the wicket passing status of the radio terminals at the stopping station which has been received from the railroad company system 65 (step S38). Owing to the above mentioned operations, it may become possible to delete the entries of radio terminals of users who are not on the train 6 in reality though seats have been booked and users who have gotten off the train 6 at the stopping station from the priority order table, thereby reducing the data size of the priority order table.

Next, the base station N judges whether the time for departure from the stopping station of the train 6 has elapsed (step S40). In the case that it does not elapse, the base station returns to step S34 to inquire the railroad company system 65 about the wicket passing status of registered terminals at the stopping station and then to update the priority order table on the basis of the contents of the response to the inquiry.

At step S40, the time for departure from the stopping station of the train 6 has elapsed, the base station N proceeds to step S42 and further updates the priority information as desired (step S42). As described, for example, with reference to the example illustrated in FIG. 4, the base station N is permitted to set higher the priority degree of a radio terminal which has been set low at the previous station and to set lower the priority degree of a radio terminal which has been set high at the previous station.

The base station N sends the next base station N+1 the priority order table (step S44). As described above, when the time for departure from the stopping station of the train 6 has elapsed, the base station N sends the next base station N+1 the priority order table, so that it may become possible to send the next base station N+1 the priority order table before the radio terminals of users who are on the train 6 start gaining access to the next base station N+1.

On the other hand, in the case that the stopping station of the train 6 is not present in the area that the base station N covers at step S30, the base station N proceeds directly to step S42. Owing to the above mentioned operation, it may become possible for the base station N to update the priority order table (step S42) immediately after the radio terminals of the users who are on the train 6 have been handed over to itself (the base station N) and then to send the next base station N+1 the updated priority order table (step S44). In the above mentioned manner, it may become possible for the base station N to send the next base station N+1 the updated priority order table before the radio terminals of the users who are on the train 6 start gaining access to the next base station N+1.

On the other hand, in the case that the stopping station which is present in the area that the base station N covers is the terminal station of the train 6 at step S32, the base station N proceeds to step S46. The base station N waits until the time for arrival at the stopping station (that is, the terminal station) of the train 6 has elapsed (step S46) and discards the priority order table after the time for arrival at the stopping station (that is, the terminal station) of the train 6 has elapsed (step S48).

Incidentally, the processes at a series of steps 71 (steps S28 to S34 and S38 to S48) to be executed using the base station N which are surrounded by a dotted line in FIG. 7B is repeated until the radio terminal concerned arrives at the base station concerned which covers an area where the terminal station of the train 6 is present.

In addition, the railroad company system 56 repetitively sends a response (step S36) to an inquiry (step S34) given from the base station N about the wicket passing status of the registered terminals at each stopping station until the train 6 arrives at the last preceding station of the terminal station.

Figure 8:
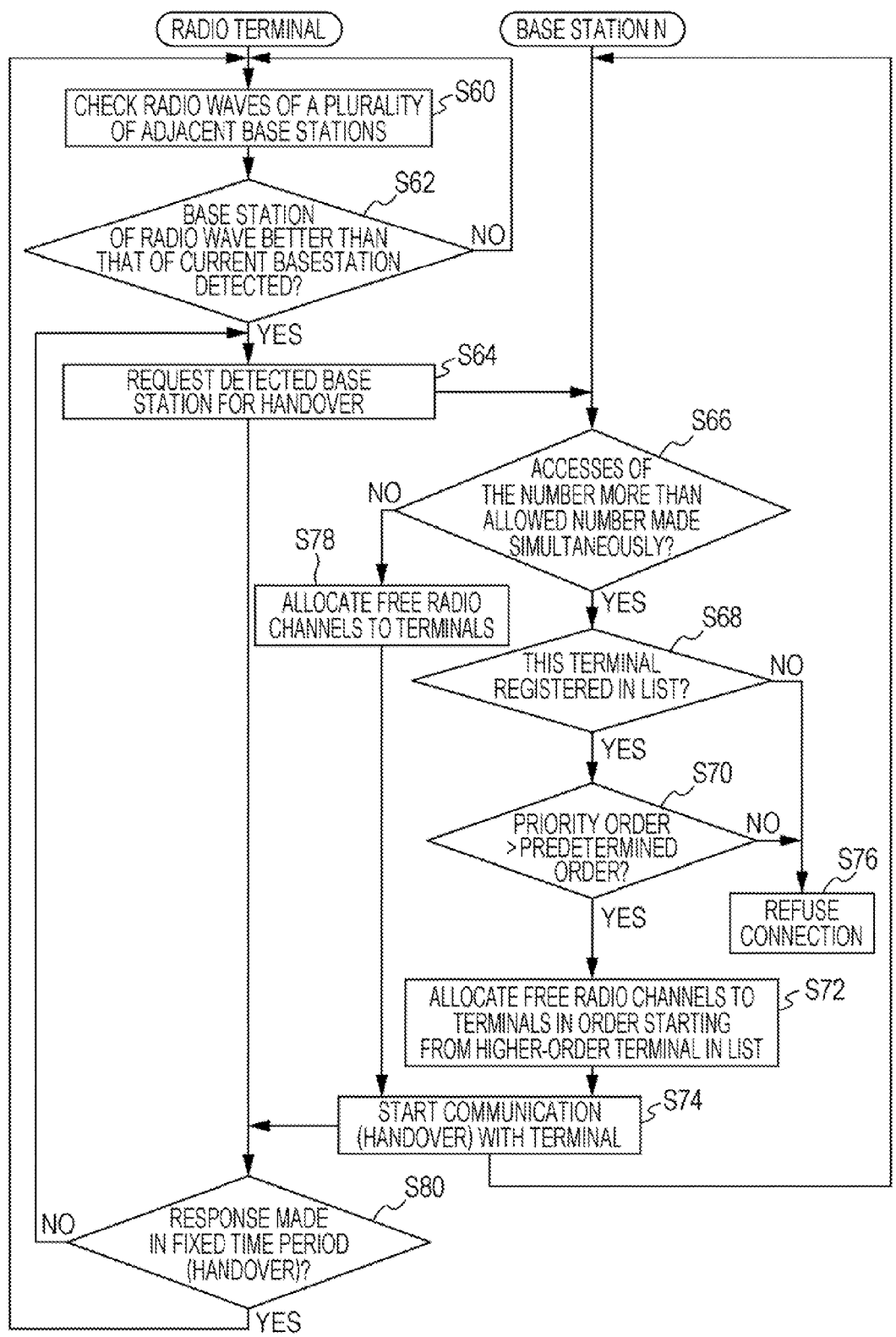
FIG. 8 is a diagram illustrating an example of a sequence for executing a communicating method according to the third embodiment.

FIG. 8 is a diagram illustrating an example of a sequence for executing the handover (step S29) illustrated in the example in FIG. 7B. In FIG. 8, although only one radio terminal is illustrated, radio terminals of the number corresponding to that of a plurality of users who are on the train 6 are prepared in reality.

In the case that a radio terminal is present in the area that, for example, the base station N−1 (N=2, 3, . . . ) covers, the radio terminal checks radio waves of a plurality of adjacent base stations (step S60).

The radio terminal judges whether a base station of a radio wave which is more favorable than that of the base station N−1 with which the radio terminal is currently in communication has been detected (step S62). In the case that the base station of the radio wave which is more favorable than that of the base station N−1 is not detected, the radio terminal returns to step S60 and keeps checking the radio waves of the plurality of adjacent base stations.

In the case that the base station (in this case, the base station N) of the radio wave which is more favorable than that of the base station N−1 is detected at step S62, the radio terminal requests the detected base station N for handover (step S64). For example, in the above mentioned situation, in the case that soft handover is to be executed, the radio terminal is in a state in which it gains access to both of the base station N−1 and the base station N.

The plurality of radio terminals are on the train 6 which is running at a high speed, so that the base station N simultaneously receives requests for handover from the plurality of radio terminals.

The base station N judges whether accesses of the number which is larger than the allowable number are made simultaneously (step S66). Judgment may be made, for example, depending on whether accesses of the number which is larger than a predetermined threshold value is made in a predetermined time period.

When accesses of the number which is larger than the allowable number are made simultaneously at step S66, the base station N judges whether the radio terminals which have gained access to the base station N are registered in the priority order table (step S68).

In the case that the radio terminals are registered in the priority order table at step S68, the base station N judges whether the priority order of each radio terminal that has gained access to the base station N is higher than a predetermined priority order (step S70). Incidentally, the predetermined priority order may be determined, for example, on the basis of the number of radio terminals that the base station N may be capable of handing over simultaneously.

When the priority order of each of the radio terminals is higher than the predetermined priority order at step S70, the base station N allocates free radio channels to the radio terminals which have gained access to the base station N in ascending order of priority (step S72).

After execution of the above mentioned processes, the base station N executes handover of the ratio terminals and starts communication with each of the radio terminals to which the free radio channels have been allocated (step S74).

Then, the base station N returns to its initial state (indicted by (2) in the sequence) and waits until requests for handover are made from a plurality of radio terminals of users who are on the next train.

On the other hand, in the case that a radio terminal which has gained access to the base station N is not registered in the priority order table at step S68, or in the case that the priority order of the radio terminal which has gained access to the base station N is lower than the predetermined priority order, the base station N refuses the request for handover made from the radio terminal (step S76).

In the case that accesses of the number which is larger than the allowable number are not made simultaneously at step S66, the base station N allocates free radio channels to the radio terminals which have gained access to the base station N (step S78).

After execution of the above mentioned processes, the base station executes handover of the radio terminals and starts communication with each of the radio terminals to which the free radio channels have been allocated (step S74).

Then, the base station N returns to its initial state (indicted by (2) in the sequence) and waits until requests for handover are made from a plurality of radio terminals of users who are on the next train.

On the other hand, each radio terminal judges whether a response to the request for handover has been given from the base station N in a fixed time period, that is, whether it has been handed over to the base station N (step S80).

In the case that handover is executed using the base station N and communication with the base station N is started, the radio terminal returns to its initial state (indicated by (1) in the sequence) and checks radio waves of a plurality of adjacent base stations.

In the case that a response to the request for handover is not given from the base station N in a fixed time period at step S80, the radio terminal returns to step S64 and requests the base station N for handover.

Figure 9:
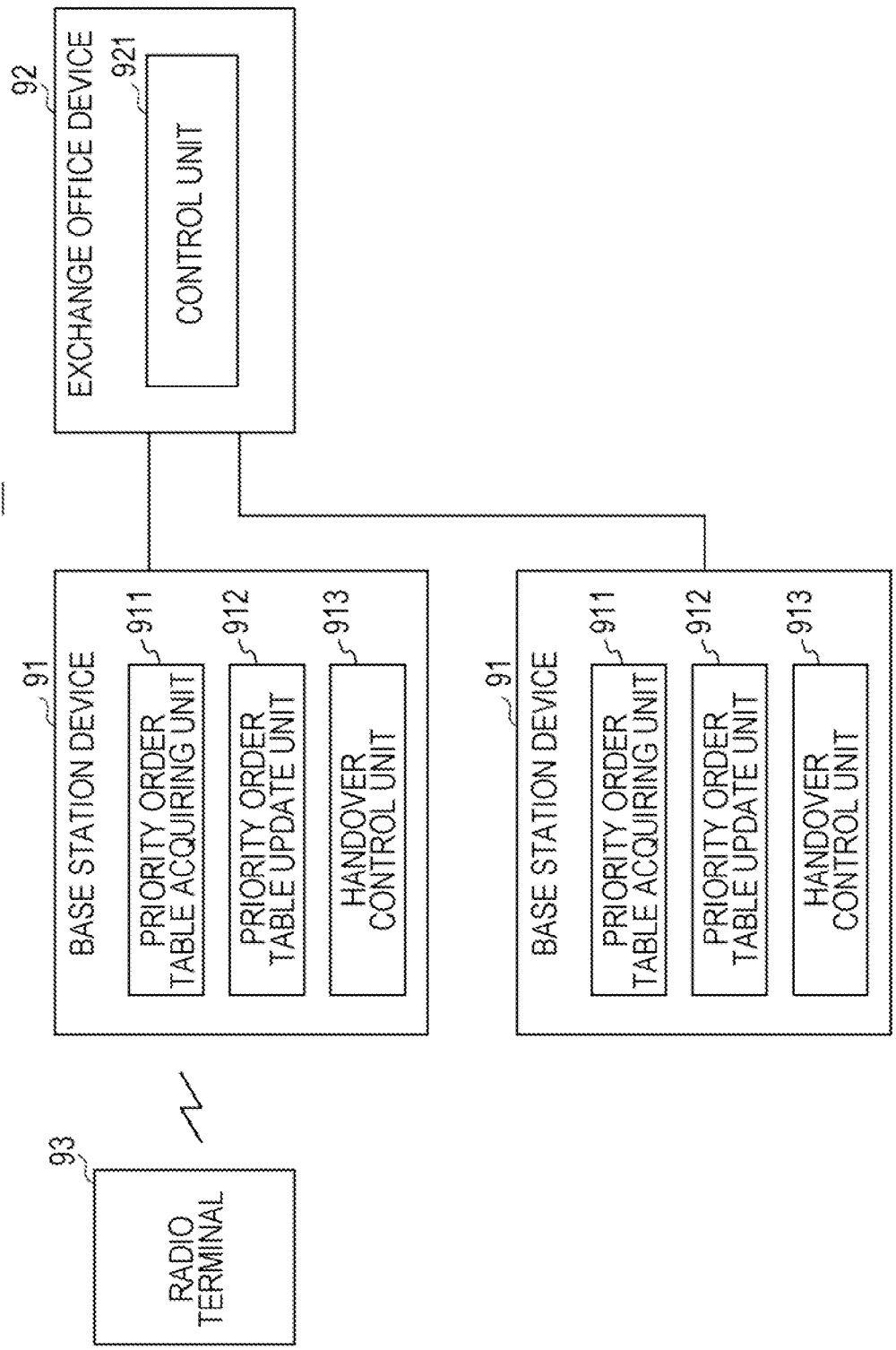
FIG. 9 is a block diagram illustrating an example of a configuration of a radio communication system including a base station device according to the third embodiment.

FIG. 9 is a block diagram illustrating an example of a configuration of a radio communication system 90 including the base station device according the third embodiment.

The radio communication system 90 includes a plurality of base station devices 91.

Each base station device 91 includes a priority order table acquiring unit 911, a priority order table update unit 912, and a handover control unit 913.

The priority order acquiring unit 911 acquires a priority order table from an external information source (for example, the railroad company system 65 illustrated in FIG. 6) or another base station device and stores the table into itself.

The priority order table update unit 912 updates the priority order table which is stored in the priority order table acquiring unit 911, for example, in accordance with a status in which registered radio terminals pass through a wicket.

The handover control unit 913 determines order in which radio terminals 93 are handed over on the basis of the priority order table stored in the priority order table acquiring unit 911 and executes handover of the radio terminals 93 in the determined order.

The radio communication system 90 also includes an exchange office device 92. The exchange office device 92 is connected with the plurality of base station devices 91 and controls transmission of the priority order table performed between the base station devices 91. The exchange office device 92 includes a control unit 921 that controls communication with each base station device 91 and controls operations involving handover of the radio terminals 93.

Figure 10:
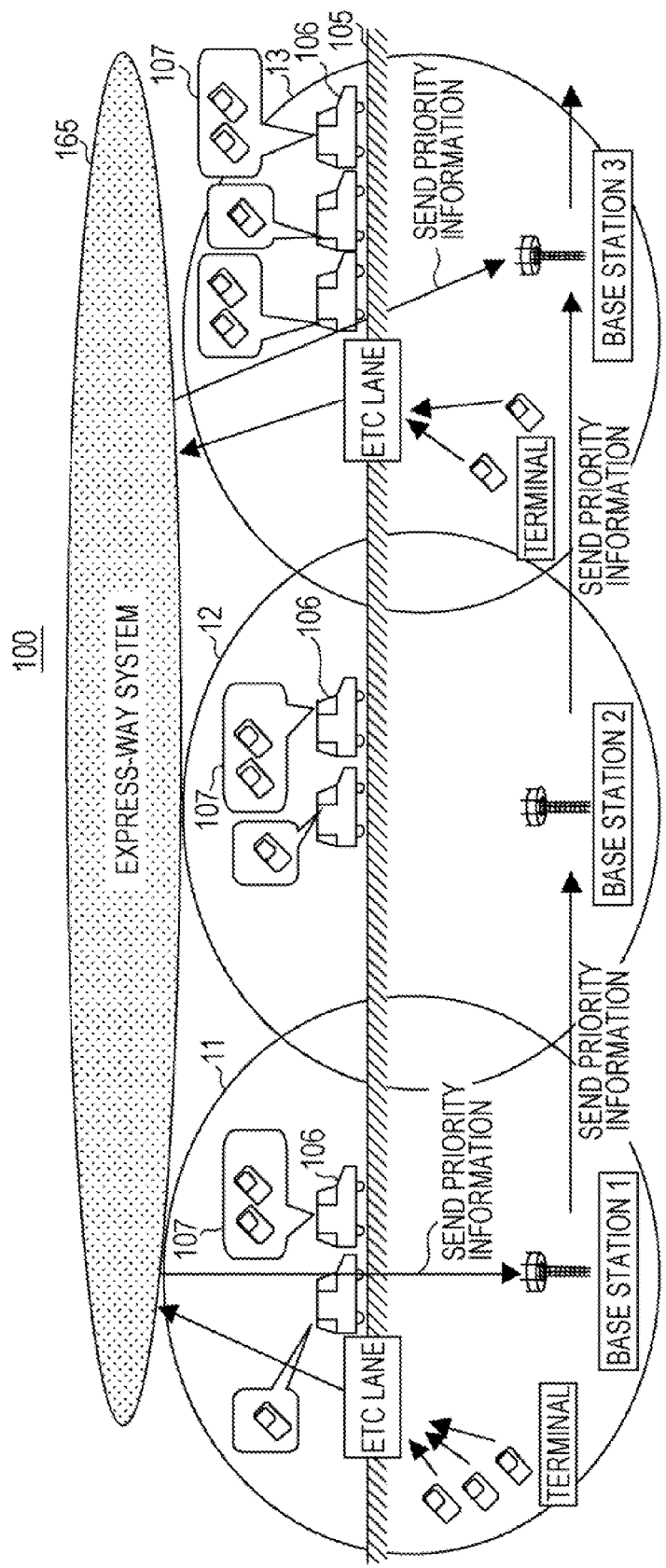
FIG. 10 is a diagram illustrating an example of a configuration of a radio communication system according to an altered embodiment of the third embodiment.

FIG. 10 is a diagram illustrating an example of a configuration of a radio communication system 100 according to an altered embodiment of the third embodiment. The above mentioned altered embodiment is obtained by applying the embodiment which is configured to be suited for a railroad as illustrated in FIG. 6 to an express-way.

The radio communication system 100 includes the base stations 1, 2, 3, . . . and the respective base stations 1, 2, 3, . . . respectively cover the areas (cells) 11, 12, 13, . . . .

The base stations 1, 2, 3, . . . are respectively disposed along an express-way 105 and an automobile (generally designated by 106) is running on the express-way 105. The example illustrated in FIG. 10 indicates a state in which the automobile 106 sequentially passes through the respective areas 11, 12 and 13 as the time goes by, by illustrating the automobile 106 in each of the areas 11, 12 and 13.

A plurality of users is on the automobile 6 and the plurality of users respectively carries their own radio terminals (generally designated by 107).

The express-way system 165 is a system that a communication server who conducts mobile communication business operates in order to generate priority information and to send the priority information to each base station. The express-way system 165 may be capable of grasping position information of each radio terminal on the express-way 105 by using a Global Positioning System (GPS) function which is installed in each radio terminal. Movement of each radio terminal in a fixed direction may be estimated by obtaining a moving history of each radio terminal on the basis of the position information.

In addition, the express-way system 165 sends the base station 1 priority information which is set so as to give a higher priority order to the radio terminal of a specific user. In the example illustrated in FIG. 10, the specific user may be, for example, an assembly man of a country, a person in charge of governmental affairs, a person in charge of medical treatment or a person in charge of maintenance of public peace and order and/or other persons.

Owing to the above mentioned operations, the radio terminal of a specific user to which the higher priority order has been given is preferentially handed over to each of the base stations 1, 2, 3, . . . . As a result, it may become possible to provide the user concerned with a more stable communication environment.

Incidentally, the above mentioned explanation of the third embodiment has been made by assuming a situation in which radio terminals are to be handed over to a base station. However, the configuration according to the third embodiment may be also applied to a situation in which radio terminals are to be-reconnected with a base station.

Incidentally, the above mentioned embodiments may be applicable to third generation systems such as a W-CDMA system and a CDMA2000 system, an LTE (Long Term Evolution) system, a fourth generation system and the like. In addition, the above mentioned embodiments may be applicable to a broadband wireless access system such as a system based on IEEE 802.16 (WiMAX) and the like.

Although the plurality of embodiments have been described, it may be also possible to combine the configuration of one embodiment with the configuration of another embodiment.

Although the embodiments of the present art have been described in detail, the present invention is not limited to a specific embodiment and may be altered and modified in a variety of ways within the scope of the gist of the present invention described in the appended patent claims.

According to the radio communication system, the base station device and the communicating method which are disclosed herein, overcrowding which would occur when a plurality of radio terminals are simultaneously handed over to or re-connected with a base station as the move destination may be avoided.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system comprising:
   a first base station for performing communication with a plurality of radio terminals; and
   a plurality of second base stations for performing communication with the plurality of radio terminals,
   the first base station estimating a moving direction of each of the radio terminals, determining one of the second base stations to which the each of the radio terminals is handed over on the basis of the estimated moving direction, obtaining priority information indicating a priority of the each of the radio terminals from the each of the radio terminals, and sending out identification information of the each of the radio terminals and the priority information of the each of the radio terminals to the determined second base station,
   the determined second base station performing handover of the radio terminals corresponding to the identification information received from the first base station on the basis of the received priority information and the received identification information.

2. The system of claim 1, wherein the first base station estimates the moving direction on the basis of a moving history and a moving schedule of the radio terminals.

3. The system of claim 1, wherein the second base station performs handover of the each of the radio terminals on the basis of the priority information when a total number of the radio terminals to be handed over in a predetermined period being equal to or more than a predetermined number.

4. The system of claim 1, wherein the second base station rejects performing handover against one of the radio terminals whose priority information being in the absence of the received priority information.

5. The system of claim 1, wherein the second base station rejects performing handover against one of the radio terminals whose priority being equal to or less than a predetermined priority.

6. A base station capable of communicating with a plurality of other base stations and a plurality of radio terminals, comprising:
   a radio communication circuitry configured to perform radio communication with the radio terminal; and
   a processor configured
   to estimate a moving direction of each of the radio terminals;
   to determine one of the plurality of other base stations to which the each of the radio terminals is handed over;
   to obtain priority information indicating a priority of the each of the radio terminals from the each of the radio terminals; and
   to send out identification information of the each of the radio terminals and the priority information of the each of the radio terminals to the other base station.

7. The base station of claim 6, wherein the processor estimates the moving direction on the basis of a moving history and a moving schedule of the radio terminals.

8. The base station of claim 6, wherein handover of the each of the radio terminals on the basis of the priority information is performed when a total number of the radio terminals to be handed over in a predetermined period being equal to or more than a predetermined number.

9. The base station of claim 6, wherein the handover is rejected against one of the radio terminals whose priority information is absent within the received priority information.

10. The base station of claim 6, wherein the handover is rejected against one of the radio terminals whose priority being equal to or less than a predetermined priority.

11. A method of controlling a system having a first base station and a plurality of second base stations, the method comprising:
   performing communication with a plurality of radio terminals by the first base station;
   estimating a moving direction of each of the radio terminals;
   determining one of the second base stations to which the each of the radio terminals is handed over on the basis of the estimated moving direction;
   obtaining priority information indicating a priority of the each of the radio terminals from the each of the radio terminals;
   sending out identification information of the each of the radio terminals and the priority information of the each of the radio terminals to the determined second base station; and
   performing handover of the radio terminals corresponding to the identification information received from the first base station by the determined second base station on the basis of the received priority information and the received identification information.

12. The method of claim 11, wherein the first base station estimates the moving direction on the basis of a moving history and a moving schedule of the radio terminals.

13. The method of claim 11, wherein the second base station performs handover of the each of the radio terminals on the basis of the priority information when a total number of the radio terminals to be handed over in a predetermined period being equal to or more than a predetermined number.

14. The method of claim 11, wherein the second base station rejects performing handover against one of the radio terminals whose priority information being in the absence of the received priority information.

15. The method of claim 11, wherein the second base station rejects performing handover against a radio terminal whose priority being not more than a predetermined priority.

* * * * *